Dec. 30, 1947.        E. G. DEYE        2,433,653
MANUFACTURE OF COMPOSITE METAL MOULDS FOR ELECTROTYPING
Filed Sept. 4, 1943        2 Sheets-Sheet 1

INVENTOR.
ERWIN G. DEYE.
BY Allen & Allen
ATTORNEYS.

Dec. 30, 1947.  E. G. DEYE  2,433,653
MANUFACTURE OF COMPOSITE METAL MOULDS FOR ELECTROTYPING
Filed Sept. 4, 1943  2 Sheets-Sheet 2
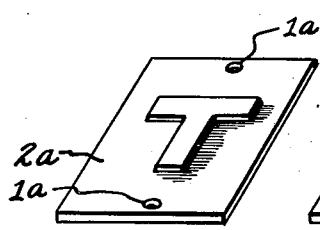
FIG. 9.
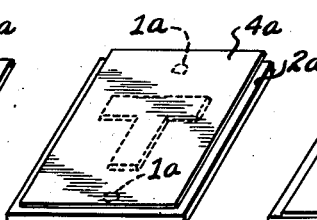
FIG. 10.
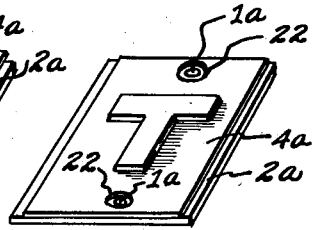
FIG. 11.
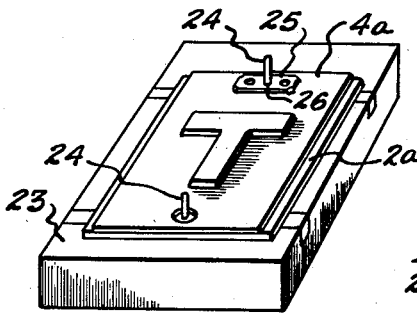
FIG. 12.
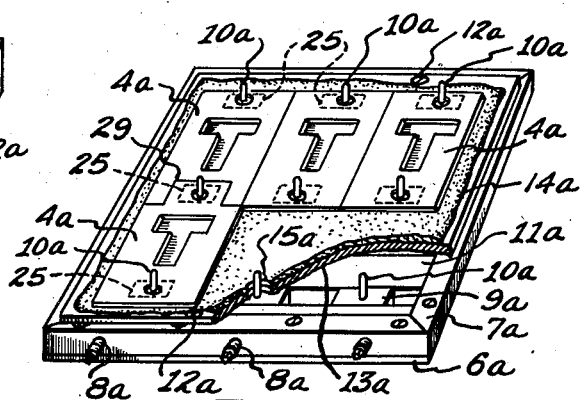
FIG. 13.
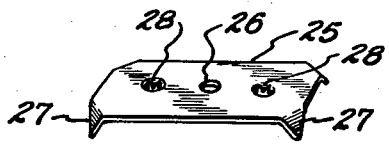
FIG. 12a.
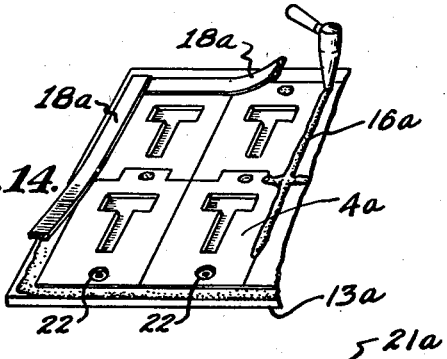
FIG. 14.
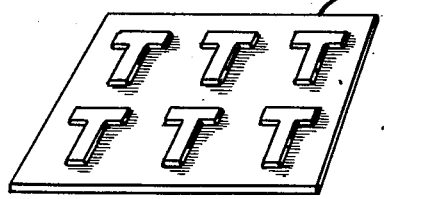
FIG. 15.  FIG. 16.
INVENTOR.
ERWIN G. DEYE.
BY
Allen & Allen
ATTORNEYS.

Patented Dec. 30, 1947

2,433,653

UNITED STATES PATENT OFFICE 2,433,653

MANUFACTURE OF COMPOSITE METAL MOULDS FOR ELECTROTYPING

Erwin G. Deye, Cincinnati, Ohio, assignor to The Quality Engraving & Electrotype Company, Cincinnati, Ohio, a corporation of Ohio Application September 4, 1943, Serial No. 501,319

2 Claims. (Cl. 204—6)

1

The present application is a continuation in part of my application, filed July 15, 1940, Serial No. 345,603, now abandoned.

My invention relates to the making of electrotypes wherein a multiple of units to be printed can be accurately registered in the electrotype and wherein this same accurate registry can be maintained in electrotypes for printing different colors in the same job.

In my application Serial No. 284,797, filed July 15, 1939, now abandoned, and of which this application forms a continuation in part, I have stated it to be my objective to perforate the engraved or master plates with holes by means of which these master plates may be accurately positioned in a composite assembly in a form. The master plates have formed thereon, by hydraulic pressure, matrices of lead or other suitable composition, commonly called moulds, which moulds are accurately positioned in the form because of accurate registry with the master plates. The master plates are provided with holes which fit over pins which are preset in the form. When the master plates are removed the matrices or moulds are positioned just as accurately as if the master plates themselves were positioned. The master plates, after having assisted in the positioning of the moulds, may be used for making other moulds. The moulds are positioned in forms on copper plates coated with wax. The entire assembly of copper plate wax coating and assembly of moulds is then electroplated to produce the finished electrotype ready for use in printing.

It is further an object of my invention, having once secured accurate registry of the moulds from the master plates, to insert positioning clips in the moulds, which positioning clips serve the same function in accurately positioning the moulds on the wax coated copper plates.

Broadly, it is an object of my invention to accomplish two significant purposes in the making of electrotypes for printing both for single color work and for multiple color work. First, it is my object to insure accuracy of position of each multiples of subjects whether the electrotype be composed of multiples of the same subject or of multiples of different subjects, so that great accuracy of the subjects on the printed sheet will permit cutting with a degree of accuracy heretofore unknown and with the elimination of much waste in cutting the printed sheets into the individual component parts. Secondly, it is my object to materially cut down the make up time heretofore required in making electrotypes.

2

The success of any method of making electrotypes is primarily determined by the "down time" of the press, and by the practice of my new method I have found that I have very materially reduced that part of the "down time" which heretofore has been necessary. The "down time," that is when the press is not running, has heretofore been lengthened by what is termed the "line up and register" operation. It has been common practice to take two-thirds of the "down time" in "line up and register" and one-third in "make ready."

By the use of my new method it is my object to cut down the "line up and register" period to from one-fifth to one-tenth of the former time required, and to also cut down the "make ready" in a corresponding amount.

It is a further object of my invention to form electrotypes without the necessity of making the master plates on base plates, and where the master plates may be thin etched or engraved plates.

It is a further object of my invention to so simplify the operations of making electrotypes that the operations may be carried out in quantity production wherein a group of operatives each can proceed with his own operation, building up stacks of work in such a way as not to interfere with the productive capacity of the next operative in the succeeding step of manufacture.

As an example of a printing operation in which my invention is of value I may note the printing of playing cards. In this operation where fifty-three small objects are to be printed either in a single color or in multiple color, it is an obvious advantage if a single electrotype plate can be formed with assurance of substantially absolute registry of each single object thereon which will permit the printed sheet to be cut with a minimum of waste and when multi-colored is done to insure substantially complete accuracy of the positioning of the different colored areas in the finished printed sheet.

I have illustrated my invention in a simple form with relatively few repetitions of the subject to be printed and will describe the structure in practice as an illustration of my invention. I have further illustrated a simplified step wherein the master plates, without base-supporting plates may be used on a repeat production basis without it being necessary to tie up the master plate as a carrier and positioner for the moulds with which the composite matrix to be electrotyped is formed.

The illustrations are for purposes of describing the invention while in the appended claims to which reference is hereby made I will set forth the novelty inherent therein.

In the drawings:

Fig. 9 is a perspective view of a master plate without a supporting base.

Fig. 10 is a perspective view of the master plate shown in Fig. 9 having a mould deposited thereon.

Fig. 11 is a like view showing the result of impressing the mould against the master plate.

Fig. 12 is a perspective view of a frame employed by the operator of the hydraulic press to accurately position the mould with respect to the master plate whereby the master plate is relieved for further use in forming succeeding moulds.

Fig. 12a is a perspective view of a positioning clip or cleat.

Fig. 13 is a perspective view showing the building up of the matrix for electrodeposition thereon.

Fig. 14 is a perspective view showing the final step in the preparation of the composite matrix.

Fig. 15 is a perspective view of the composite matrix ready for electroplating.

Fig. 16 is a perspective view of the multiple electrotype plate.

Figure 1:
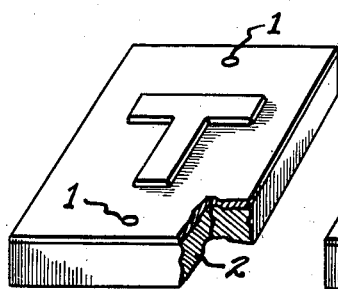
Figure 1 is a perspective view of a master plate.

At the start of my practice, engravings or master plates are made, one for each subject, and one for each color of each subject. One way in which this may be done is to provide in connection with the artist's drawing from which the engravings for the several master plates for each color of each subject are to be made, a mark which will indicate points on the engraving or master plate which will later be drilled with holes. Thus in Figure 1, is shown a master plate of a letter T and in Figure 8 a master plate of an outline for the letter T, which is to be of a different color. In each of the master plates the circles or marks I are made a part thereof. When the master plates are mounted on base plates 2, the circles are used as guides for drilling holes 3 through the base plates which are to be used in making up the multiple matrix. Accordingly, each subject in its various repetitions for different colors will be formed into a multiple matrix. Where the same subject is to be repeated in each multiple matrix, a single master plate will serve to make up each multiple matrix. Where there are different subjects on each multiple matrix, the artist's drawing will be depended upon for accuracy in perforating the holes in the master plates formed therefrom.

Figure 2:
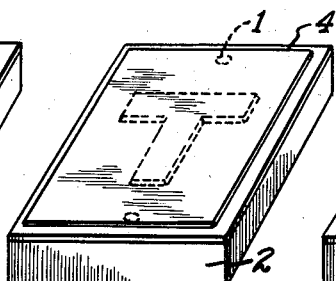
Fig. 2 is a view of the said plate with a lead alloy surface deposited thereon.
Figure 3:
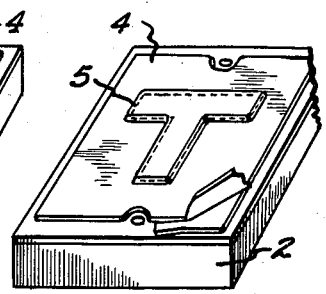
Fig. 3 is a like view showing the result of impressing the said applied surface against the master plate.

Referring now to Figure 2, the operation upon each master plate will be to apply a sheet of lead alloy 4, to the master plate and by application of a heavy but somewhat cushioned pressure to form the structure shown in Fig. 3, in which the lead foil or other suitable moulding material is forced to take the shape of the master plate, as indicated at 5.

Figure 4:
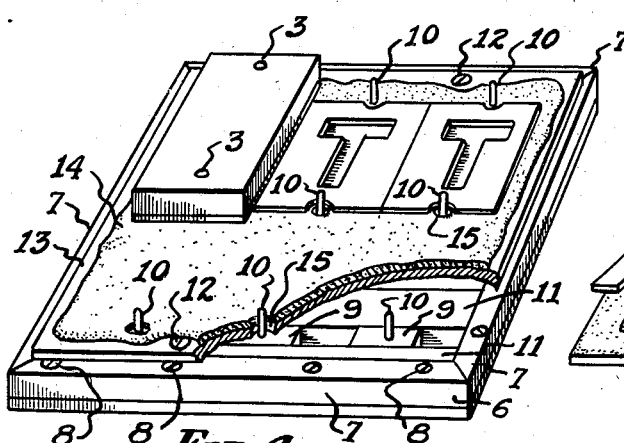
Fig. 4 is a perspective of a form, during the course of building up the matrix for electrodeposition thereon.
Figure 5:
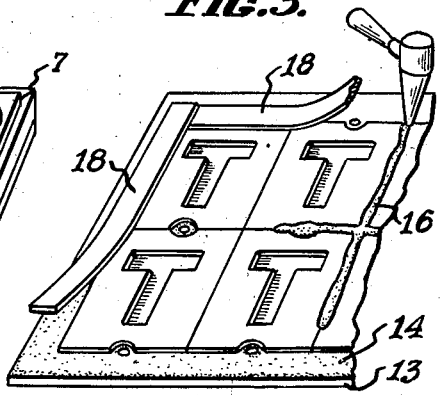
Fig. 5 is a similar view showing the final step in preparation of the matrix.

Referring now to Fig. 4, I have shown a frame 6, which is rigid and to which are securely screwed the side bars 7. In these bars will be screws 8 which are used to lock up the pin structure. Thus I may provide a series of pin bearing blocks 9, having projecting pins 10 thereon which fit the holes in the master plates. There are also spacer bars 11, which may be of various sizes so that the spacing of the pin blocks can be arranged to produce within the frame structure, a series of interspaced pins in accurate position to correspond with the circles on the master plate, or some diagram which will indicate the correct position of each pin.

Some other means of setting up the pins in proper position may be employed, such as to proceed as in forming the master plates, and then drill and set pins to correspond. The essential is to produce a frame in which pins project so as to provide for mounting thereover the number of individual subjects represented on the master plates for each color to be printed.

Proceeding to make up the matrix, I place on the frame and temporarily retain by means of screws 12, a copper plate 13, to which has been applied a suitable wax coating 14, same being smoothed according to proper practice. The matrix plate will have holes 15 therein, of sufficient oversize to permit of ready screwing of the matrix plate temporarily on the frame, and through these holes the pins 10 project.

I now proceed by taking the master plate, in this instance using the same one for making a multiple of the same subject, for the first color. I set the master matrix with the lead coating downward over a pair of pins. It may be desirable and I will ordinarily trim the lead element or moulding material back beyond the holes in the master, so that the same pin for the bottom of one master plate can be used for the top of the impression made next below it on the multiple matrix. Now by applying pressure the lead matrix is caused to cling to the wax and the master plate can be released, and after forming another matrix 4, moved over to the next set of pins and this practice repeated.

If a different subject is to be used next, naturally another master plate will be used.

Figure 6:
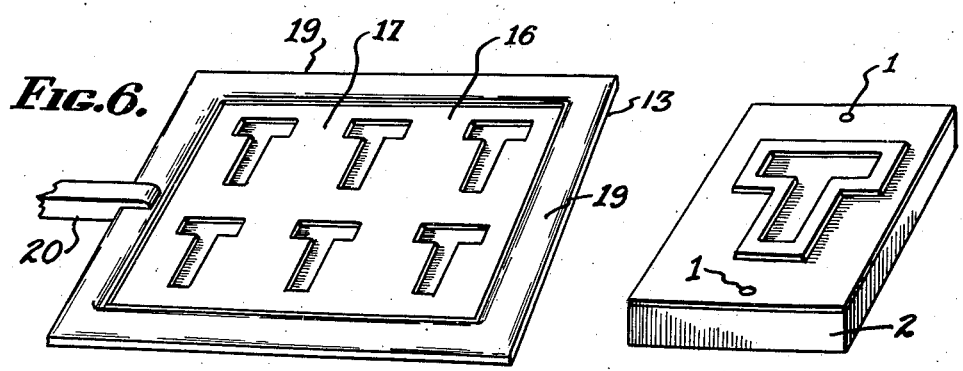
Fig. 6 is a view of the matrix ready for electroplating.
Figure 7:
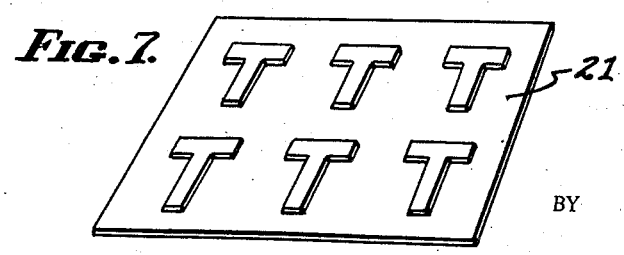
Fig. 7 is a perspective of the multiple electrotype plate.

Proceeding as illustrated I form a composite matrix of the lead sheets from the master plates, and then I proceed to fill any cracks with wax to produce a smooth surface as indicated at 16, and remove the copper plate from the frame. The edges of the copper plate will then preferably be covered with strips 18 say of lead alloy and coated with insulating wax where desired as at 19, and the completed matrix as indicated at 17 in Fig. 6 is then ready for electroplating. By applying a gripper 20 to the matrix which engages electrically, the lead surface of the matrix, and thus retaining the plate in an electroplating bath, a positive copper coating is produced thereon, which when stripped away forms the composite electrotype plate 21 as seen in Fig. 7, containing the subject or subjects in multiple and having what may be termed machine made accuracy in registration.

I then use the same pin form again with the master plates for the next color, and produce an electrotype plate in the same manner. Thus this plate will contain a multiple of the same subjects in the second color in identically the same register.

It would, of course, be possible to make up a series of pin forms which are identical as to the pins, but I prefer to use the same pin form for each so that any variations will be simply repeated, and absolute register maintained.

It is not essential that the lead alloy members or sheets 4 be employed in forming the matrix. Using the pins 10 as guides, the impressions of the master plates may be imprinted into the waxed surface 14 of the copper plate, and, after treating or coating this imprinted waxed surface with graphite, by methods commonly known in the art, the electroplating may be accomplished without the use of the alloy members 4. It will thus be apparent that I am not limited to the precise construction or assembly of the matrix as illustrated in detail in my drawings, but by what I claim to be new and patentable in the claims which follow.

It is not necessary to have the pins in the pin frame symmetrically arranged in lines normal to each other, as shown in the drawings. By the use of the pin frame with the pins properly placed in accordance with the several subjects to be included thereon, and the holes formed in the subjects preferably indicated on the artist's drawings so as to be alike for each color, there will be a true register of colors from plate to plate in the final set of the electrotype plates.

Various departures from the exact disclosure above will be possible as will be evident to the electrotyper, without departing from the spirit of my invention. I have referred to holes in the master plates and pins in the frame. It will be understood that this can be reversed and pins inserted into the master plates with holes instead of pins in the pin frame.

Referring now to Figs. 9 to 16 I have shown a method of securing exact registry of a multiple of single subjects or of subjects for multi-colored work wherein the engraved or etched plate does not need to be supported on a base block and wherein the moulds which are mounted in the frame on the wax coated brass plate used for electrotyping are provided with positioning clips or cleats having registering holes therein which obviate the necessity of using the master plates as in the first form of the invention described in connection with Figs. 1 to 8.

In Fig. 9 there is shown a master plate 2a of a letter T, said plate being provided with holes 1a. Fig. 10 is a perspective view of the master plate having a sheet of lead alloy 4a, called a mould positioned thereon. Fig. 11 shows the assembly illustrated in Fig. 10 after it is subjected to hydraulic pressure which causes the positive of the letter T to be impressed as a negative on the surface of the mould 4a which abuts the etch or engraved surface of the master plate 2a.

In practicing the method described in Figs. 9 to 16 a hole 22 is cut through the mould 4a, the diameter of the hole being sufficiently large to leave a substantial opening around the register holes 1a.

Fig. 12 shows a jig 23 having base plates mounted therein from which extend pins 24 arranged so that the master plate will fit down snugly on the jig with the holes 1a registering with the pins 24.

The assembly shown in Fig. 11 consisting of the master plate with the mould formed thereon is positioned in the jig 12 and clips or cleats 25 having holes 26 of substantially the same diameter as the holes 1a are hammered down onto the back surface of the mould 4a so that teeth 27 and downwardly indented teeth 28 will gouge into the surface of the lead alloy 4a.

It will be obvious that once the positioning cleats 25 are positioned in the rear surface of the moulds 4a, thereafter the moulds 4a may be as accurately positioned as if the master plates acted as positioning carriers for the moulds.

In Fig. 13 an assembly similar to that shown in Fig. 4 is employed. There is a frame 6a which is rigid and to which are securely screwed the side bars 7a. In these bars there are screws 8a which are used to lock up the pin structure. A series of pin bearing blocks 9a having projecting pins 10a thereon fit the holes 1a in the master plates or the holes 26 in the positioning cleats 25 which are secured to the rear surface of the moulds 4a.

There are in the frame 6a spacer bars 11a, which may be of various sizes and shapes so that the spacing of the pin blocks can be arranged to produce within the frame structure a series of interspaced pins in accurate position to correspond with the position of the holes 1a and the holes 22 in the master plaes or the moulds.

In connection with the form the only requirement is to produce a frame in which pins project so as to provide for mounting thereover the number of individual moulds which it is desired to reproduce in the finished electrotype.

As in Fig. 4, the form shown in Fig. 13 has a copper plate 13a secured thereto with screws 12a. On the plate 13a there is a suitable wax coating 14a which is smoothed in accordance with proper practice. The matrix or composite assembly including the copper plate and the wax coating has holes 15a therein of sufficient oversize to permit the matrix plate to be temporarily screwed onto the frame with the pins 10a projecting through the holes 15a.

The lead foil or mould will ordinarily be trimmed at the edges so that the side edges of the moulds will not overlap.

By cutting away the lower portion of the mould as indicated at 29 in Fig. 13 after the upper mould has been positioned on the wax surface, the portion occupied by the positioning cleat may be cut away and another mould also having positioning cleats may be cut away so that the same pin may be utilized for the bottom of one mould and the top of another.

After the moulds 4a are mounted in the form illustrated in Fig. 13, with the impressed surface this time facing upwardly the irregular cut edges of the moulds may be filled in with wax as indicated at 16a in Fig. 14.

For electroplating, the edges of the copper plate 13a are preferably covered with strips 18a of lead alloy and coated with insulating wax where desired as indicated at 19a, and then the completed matrix as indicated at 17a, is ready for electroplating.

A gripper 20a is secured to the matrix and this gripper is in electrical contact with the lead surface of the matrix. It is thus retained in the electroplating bath where a copper coating is produced thereon, which when stripped away forms the composite type electroplating 21a as shown in Fig. 16 containing the subject or subjects in multiple and having what may be termed machine made accuracy of registration of the various subjects.

Figure 8:
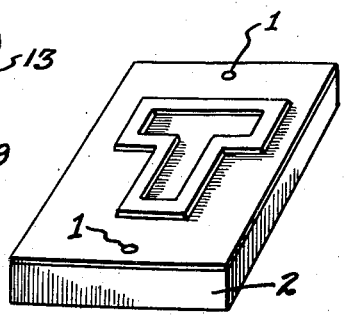
Fig. 8 is a perspective of another subject, to be used for another color, in making up a companion electrotype plate, having the same registry of individual subjects.

As indicated in Fig. 8 and as described, the pin form 6a may be used for setting the moulds for making electrotypes for multi-color printing. The process of producing the electrotypes using a second master plate as indicated in Fig. 8 will be exactly the same as for preparing to make electrotypes from a master plate such as is shown in Fig. 9. The electrotype when made will contain a multiple of the same subjects for printing a second color.

While it is possible to make up different pin forms for setting the composite matrices for multi-color printing, I prefer to use the same pin form for the same job, in which event slight variation will be repeated and substantially absolute register maintained.

As I have stated in connection with the modification of the invention illustrated in Figs. 1 to 8 using the pins 10 or 10a as guides, the impressions of the master plates may be imprinted in the wax surface on the copper plate, and after treating or coating this imprinted wax surface with graphite, by methods commonly known in the art, the electroplating may be accomplished with the use of the moulds 4a.

The difference between the modification of the invention shown in Figs. 1 to 8 and that shown in Figs. 9 to 16 is in the practical utility for high speed production work of the modification illustrated in Figs. 9 to 16, wherein the positioning cleats 25 are employed to obviate the necessity of positioning the master plates themselves in the assembly or pin form from which the electrotypes are made.

In order to recite in detail a preferred method of carrying out the steps of my invention, I will now recite a preferred practice utilizing for the purpose of explanation, the exact procedure and detail of procedure in the practice of my process as used in the shop over which I have supervision.

The master plate (2a, Figs. 9–12) has been carefully marked with points, one at each end of the plate. These points are preferably intermediate to and are on a line parallel with lines extended lengthwise of the plate on the background thereof. These side edge lines are carefully drawn on the background of the master plate to outline how far from the side edges of the designed portion of the master plate reproduction is necessary to properly reproduce the design without waste. Often master plates have the background extended further at the side edges than it is necessary to reproduce. This is waste space. Electrotypes which are multiples of the master plate may be cut along these side edge lines and joined along these lines so that all of the waste space in the background at the sides of the master plate need not be reproduced. This saves both metal in making the electrotypes and permits cutting of the individual printed sheets after printing with a minimum of waste of paper. The operator using an electric drill with, in this instance, a $\tfrac{7}{8}$ inch bit, drills a hole at each end of the master plate, it being important that the hole drilled shall have its exact center at the predetermined points which have been marked.

After the positioning holes have been drilled in the master plate a sheet of mould metal of such width as will fill in the space between the side edge lines on the master plate, is laid on the designed surface of the master plate and the combined plate and sheet, together with a pad as backing for the sheet, is subjected to such compression in a hydraulic press as will cause the adjacent face of the mould metal sheet to form a proper negative of the positive design of the master plate.

The combined mould and master plate is then laid on a table and by means of a leather punch having one jaw provided with a $\tfrac{7}{8}$ inch pin and the other with a slightly larger tube, a hole is punched in each end of the mould metal negative. By inserting the $\tfrac{7}{8}$ inch pin of the punch into the hole in the master plate exact registry of the slightly enlarged holes in the mould metal negative will be obtained.

With slide calipers carefully set on the two points at the ends of the master plates, a jig is then made up with pins exactly $\tfrac{7}{8}$ inch in diameter, the centers of the pins being spaced precisely on the points at the ends of the master plate. The combined master plate and mould metal negative are placed on this jig. The pins of the jig will extend through the holes in the master plate and the enlarged holes in the negative. Steel cleats having $\tfrac{7}{8}$ inch holes (26, Fig. 12a) and downwardly projecting teeth 27 are then centered on the pins of the jig and the cleats are driven down with a swage.

A frame is then assembled with pin blocks (9a, Fig. 13) spaced so as to receive the moulds in properly aligned position. This may be done by using the master plate to determine the spacing of the pins or a slide caliper may be employed to properly locate the pin blocks. Each set of pins is for exact registry with the holes in the cleats in the mould metal negatives. The widthwise spacing of each series of pin blocks, one for the top and one for the bottom of each negative is carefully measured to correspond with the side edge lines on the master plate.

After each mould metal negative is provided with cleats, as has been described, the side edges of these negatives is carefully trimmed in a cutting machine so that the width of the mould metal negatives will correspond exactly with the space between the side edge lines on the master plate. The formation of the negatives reproduces these side edge lines from the master plate so that an exact guide for the cutting of the side edges appears on the faces of the negatives.

After cutting the side edges, the negatives are mounted on the frame in side by side relation with the centers of the cleats fitted over the end spacing pins in the pin blocks which have been previously set up in the frame.

After a desired number of negatives have been mounted in side by side relation in the frame, the operator solders the negatives together, the solder being carefully applied along the adjacent side edges of each negative sheet so as not to flow out over the designed portion of the negative. Reinforcing strips are soldered at the sides and ends of the composite assembly.

The composite assembly of negative moulds is then lightly tacked to a cathodic plate, called a case, which supports the assembly of molds in flat condition. The electroplating process is then carried out in the usual manner after which the case is removed and the composite assembly of moulds peeled off as a shell from the composited electroplate.

The electrode will be an exactly spaced replica of the original master plate. It will be obvious that with master plates for multi-color printing as long as each master plate has its end holes and side edge lines carefully predetermined, the same jigs and the same frames will serve for each series of electrotypes for the different colors. The set-up time on the press will be greatly reduced and the registry in multi-color printing will be found to be more accurate than has been customary in multi-color printing.

One particular feature of the invention which obviates the possibility of error in the accurate locating of the perforations in the moulds is that the clips having the centering holes are positioned while the moulds are in actual contact with the master plate. It is this feature which insures accurate registry of the moulds in the frame.

I include within the scope of my invention the mere reversal of parts in accordance with general rules of the application of mechanical skill. It will be apparent to those skilled in the printing, electrotyping and photoengraving art that the method herein described may be employed in photoengraving work wherein the original etched plates from the original photographs or art work to be reproduced, become the master plates. The saving in the elimination of etching a series of master plates is thought to be obvious.

Having thus described my invention, what I claim as new and desire to secure by Letters Patent, is:

1. In the manufacture of composite metal moulds for electrotyping from a single master plate the steps which comprise accurately perforating and marking the master plate, placing a thin sheet of mouldable metal against the designed surface of the master plate, pressing the master plate and mould sheet together to cause a negative impression to be formed in the adjacent face of the mould sheet and while the master plate and mould sheet are still in contact, making perforated portions in the mould sheet in accurate registry with the perforations in the master sheet, and fastening positioning cleats having perforations therein of similar size and shape as the perforations in the master plate against the rear surface of the mould sheet.

2. In the manufacture of composite metal moulds for electrotyping from a set of single master plates, one for each color, the steps which comprises accurately and similarly perforating and marking each master plate, placing a thin sheet of mouldable metal against the designed surface of each master plate, pressing each master plate with its respective mould sheet together to cause a negative impression to be formed in the adjacent face of the mould sheet and while each master plate and mould sheet are still in contact making perforated portions in the mould sheet in accurate registry with the perforations in each master sheet, and making up composite metal moulds for electroplating of the individual mould plates using the perforations to insure registry of each set of mould plates to correspond with each master plate.

ERWIN G. DEYE.

REFERENCES CITED

The following references are of record in the file of this patent:

UNITED STATES PATENTS

| Number | Name | Date |
|---|---|---|
| 697,256 | Kaplan | Apr. 8, 1902 |
| 1,171,819 | Warren | Feb. 15, 1916 |
| 1,505,082 | Blaetz | Aug. 19, 1924 |
| 1,584,368 | Geiger | May 11, 1926 |
| 2,000,756 | Heck | May 7, 1935 |
| 2,073,040 | Wood | Mar. 9, 1937 |

FOREIGN PATENTS

| Number | Country | Date |
|---|---|---|
| 8,743 | Great Britain | 1840 |